L. JORDAN & L. E. SMITH. The Collins Company, Assignee.

Wrenches.

No. 5,294. Reissued Feb. 25, 1873.

Witnesses.

S. Häpelin.

T. E. Steele.

Assignee of Inventors

The Collins Company

Lucius Jordan & L. E. Smith by W. E. Simonds Atty.

Solicitor Hartford Conn.

N. PETERS, Photo-Lithographer, Washington, D. C.

UNITED STATES PATENT OFFICE.

THE COLLINS COMPANY, OF COLLINSVILLE, CONNECTICUT, ASSIGNEES OF LUCIUS JORDAN AND LEANDER E. SMITH.

IMPROVEMENT IN WRENCHES.

Specification forming part of Letters Patent No. 50,364, dated October 10, 1865; reissue No. 3,852, dated February 22, 1870; reissue No. 5,294, dated February 25, 1873.

*To all whom it may concern:*

Be it known that LUCIUS JORDAN and LEANDER E. SMITH, of Southington, in the county of Hartford and State of Connecticut, invented a new and useful Improvement in Wrenches, of which the following is a specification:

*Nature and Objects of the Invention.*

The object of this invention is the prevention of end thrust or back pressure on the wooden handle of wrenches, which has heretofore availed to quickly destroy such wooden handles, and, in destroying the handles, has left the working parts of the wrench which depended upon the handles for support without such support, so as to injure and effectually impair their working qualities and efficiency; and is accomplished by so connecting the step which forms a bearing for the lower end of the screw-rod with the bar which forms the main part of the wrench that the back pressure put upon the step by the screw-rod will be directly transmitted to the wrench-bar at the place of connection therewith, and will not be transmitted to and mainly put upon the wooden handle.

*Description of the Accompanying Drawing.*

Figure 1:
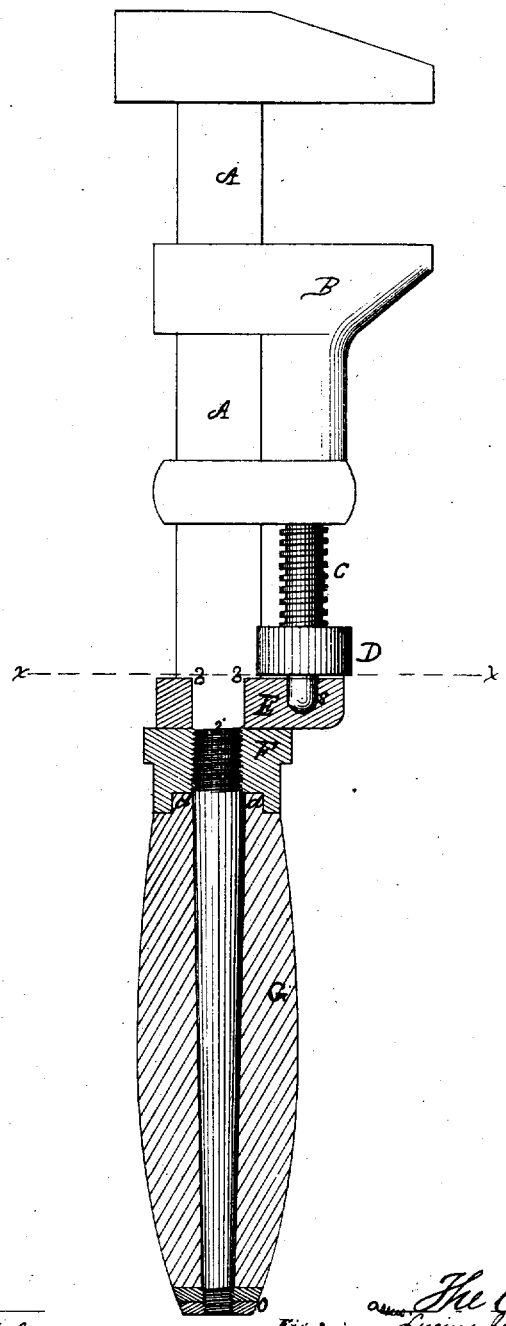
Figure 2:
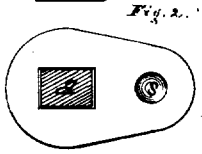

Figure 1 is a side view of the whole wrench, the part below the dotted line *x x* being in section. Fig. 2 is a top or plan view of the step which forms a bearing for the lower end of the screw-rod.

*General Description.*

The letter A indicates the wrench-bar, flat-sided down to the under side of the step E, and from thence downward cylindrical or of other convenient shape, so as to take upon it the wooden handle G. B is the movable jaw. The letter C indicates the screw-rod, and D the rosette by which it is turned. The letter E indicates the step, in which is the bearing *s* for the lower end of the screw-rod, and also the hole *a* to admit the bar A, and fitting up against the shoulder *b*. On the bar A, just below the step E, is cut the screw-thread *i*, on which screws the nut F, forming a projection from the wrench-bar, on which rests the step E, and thus transmits the back pressure put upon the step directly to the wrench-bar at the place of connection therewith, and thus relieves the wooden handle therefrom, the connection of the step with the bar being made in such manner that the step may be removed or taken off the bar without any cutting or abrasion of parts.

The nut not only supports the step, but can be made to rigidly fasten the step to the bar by screwing it firmly up against the step so as to gripe it between itself and the shoulder *b*, thus giving the nut, so to speak, a double office, viz., that of supporting the step, and, also, that of fastening it rigidly to the bar. The nut is interiorly recessed at *d* for the purpose of forming a ferrule for the top of the wooden handle.

Heretofore the part designed to perform the office of the step E has rested directly on the wooden handle, which was secured upon the bar by a light nut, *o*, at the lower extremity of the bar, which is the present method of fastening on the handle.

It is known that, previous to this invention, steps have been forged or otherwise produced solid with the bar, and this became as much a part of it as the solid head at extremity of bar; and also by riveting to reach similar result; but such method, by making a permanent fastening, renders it impossible, or a work of great difficulty, to displace the step in order to remove the sliding jaw for repairs. It will be observed that, while JORDAN and SMITH'S method of fastening is as firm as the permanent fastenings last above referred to, their step can readily be removed and again put in place at pleasure.

It is believed that SMITH and JORDAN were the first to secure easy divisibility of step and bar, together with a fixed or stationary step when in position, and at the same time supporting the step, when in position, immediately by the bar, and not mediately through the handle, as the manner had been.

As a matter of definition, the JORDAN and SMITH method of fastening and supporting the step when in position is denominated "removable" hereinafter in contradistinction from a connection and support made by forging or otherwise producing the step in one solid piece with the bar, and, therefore, a part of it; or by riveting it thereto, or the like.

*Claims.*

1. The step, combined with the wrench-bar and supported by the nut F, or its equivalent, at the place where the step is connected with the bar, in such manner that the step can be removed from the bar without cutting or abrasion of parts.

2. The nut F, combined with the wrench-bar, and interiorly recessed at *d*, for the purpose set forth.

3. The nut F, combined with the threaded bar, and performing the office of supporting the step, and also of rigidly fastening it to the bar, for the purpose set forth.

In witness whereof the COLLINS COMPANY has hereto set its hand.

THE COLLINS COMPANY,
By W. J. WOOD,
*Vice President and Chief Executive Officer.*

Witnesses:
CHAS. BLAIR,
LUKE CHAPMAN,
EDWARD H. SEARS.